May 29, 1928.  R. KIRBY  1,671,295
ENDLESS CROSS CUT SAW
Filed Jan. 26, 1926
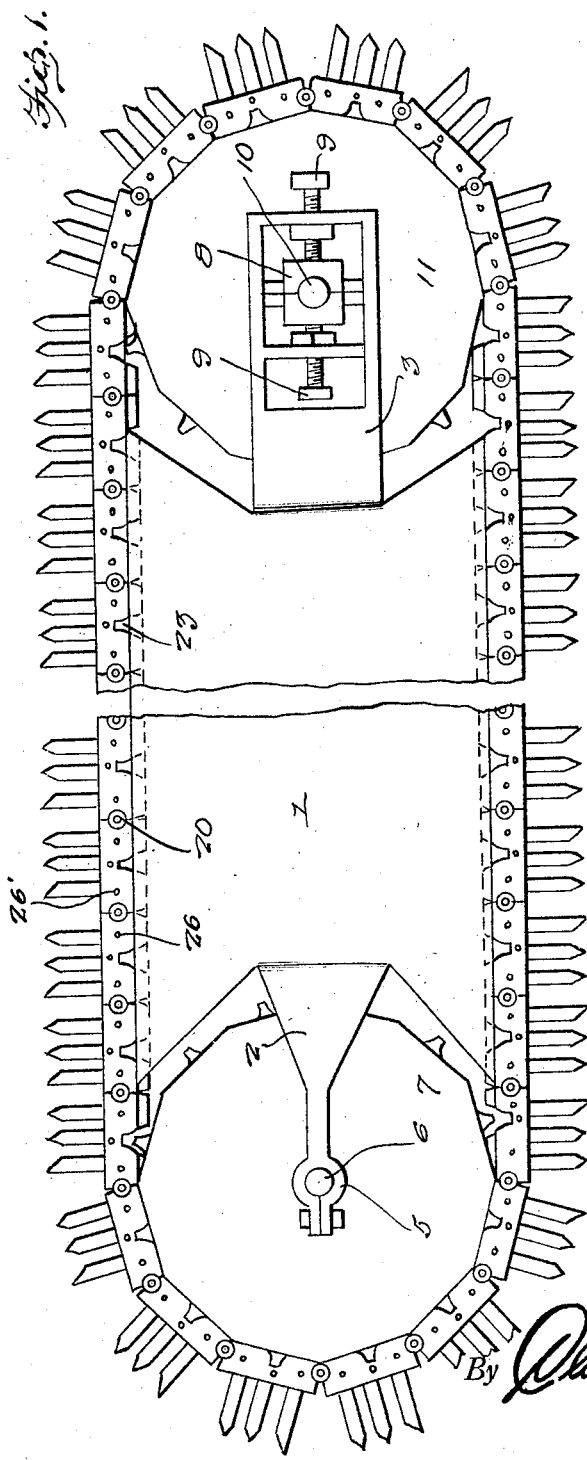
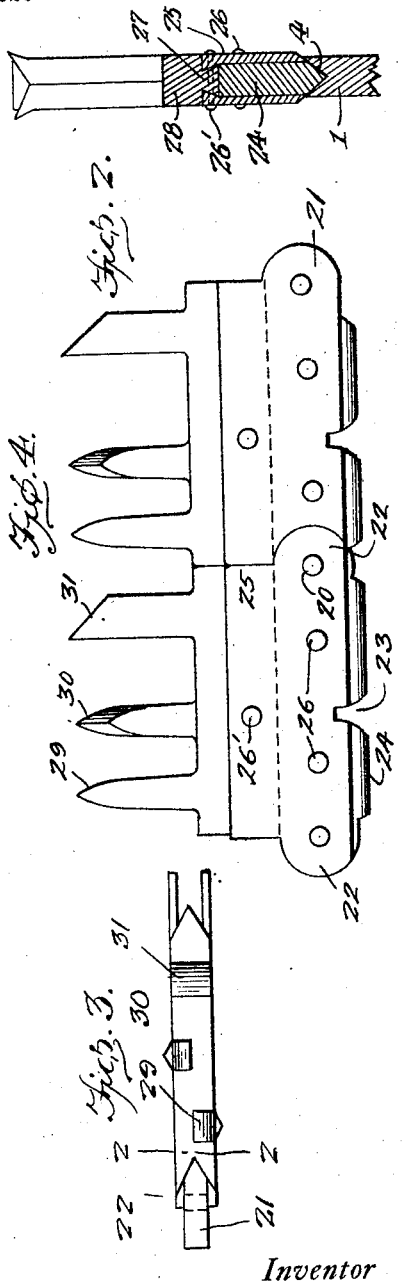
Inventor
*R. Kirby*
By *Clarence A. O'Brien*
Attorney Patented May 29, 1928.

1,671,295

UNITED STATES PATENT OFFICE.

RALPH KIRBY, OF VICTORIA, BRITISH COLUMBIA, CANADA.

ENDLESS CROSSCUT SAW.

Application filed January 26, 1926. Serial No. 83,852.

My present invention has to do with saws of the endless chain or belt type; and it has for its general object the provision of a saw of said type, designed more especially for felling trees and for rough carpenter work, the saw being adapted to cut fast and requiring but little power for its proper operation, and being also adapted to be removed quickly from the driving means so that it can be easily handled in the wood and in a rough country for movement from tree to tree.

Other objects and practical advantages of the invention will be fully understood from the following description and claim when the same are read in connection with the drawings, accompanying and forming part of this specification, in which:—

Figure 1 is a side elevation showing complete the saw constituting the best practical embodiment of my invention of which I am cognizant.

Figure 2 is an enlarged cross section taken in the plane indicated by the line 2—2 of Figure 3, looking toward the right.

Figure 3 is a detail plan view illustrative of one of the links of the endless chain.

Figure 4 is an enlarged elevation of two of the links coupled together.

Similar numerals of reference designate corresponding parts in all of the views of the drawings.

Among other elements my novel saw mechanism comprises a body plate 1 having offsets 2 and 3 at its ends, the said offsets 2 and 3 being arranged in a plane alongside of and closely adjacent to the plane of the major portion of the plate 1. I would also have it understood at this point that the longitudinal edges 4 of the major portion of the body plate 1 are provided with V-shaped grooves as positively shown in Figure 2.

The offset end portion 2 of the body plate 1 is provided at 5 with a clamp to receive and hold the shaft 6 of an idler sprocket 7. The offset end portion 3 is of open form and is designed to receive a bearing box 8, the said box 8 being located between adjusting screws 9 for taking up slack, and being designed to receive the shaft 10 of a driving sprocket wheel 11, the shaft 10 being adapted to be appropriately connected with any desired means for driving the gear 11 and the endless chain hereinafter described. At this point I would have it understood that it is within the purview of my invention to employ at the opposite side of the wheels 7 and 11 to that shown in Figure 1 duplicate offset end portions 2 and 3 so that both of the sprocket gears 7 and 11 will be adequately supported and held against lateral deflection.

The endless belt or chain comprised in my improvement is adapted to travel in the grooves or channels 4 in the longitudinal edges of the major portion of the body plate 1, and is also adapted to travel about the sprocket gears or wheels 7 and 11, the chain being driven, of course, by the sprocket wheel 11.

As will be readily understood from Figures 1, 2 and 3, the chain is made up of links arranged end to end and pivotally connected together at the point 20, it being understood in this connection that each link is provided at one end with a male joint member 21 and at its opposite end with a female joint member 22 formed by extensions on plate 25. It is through these parts that the pin 20 extends. It will also be understood that each link is provided with a space 23 to receive sprocket teeth, and that in the preferred embodiment of the invention the body portion 24 of each link has at opposite sides thereof the plates 25 fixedly connected to the links by transverse rivets 26 and arranged to engage and hold between them the dovetail portion 27 of a tooth carrying body 28, the teeth integral with the said body 28 being the cutting teeth 29 and 30 and the rake tooth 31, Figures 2 and 3; the cutting teeth 29 and 30 being arranged in parallel closely adjacent planes and the rake tooth extending through the width of the body 28 and being intended, as its name imports, to rake or clear away the cuttings or saw dust. A rivet 26' fixes the dove-tailed portion 27 between the plates 25. The detachable connection of the tooth carrying body of each link to the link proper as shown in Figure 2 is designed more especially for incorporation in heavy saws, and I would therefore have it understood that it is within the purview of my invention to form the teeth 29, 30 and 31 integral with the link proper when deemed desirable.

In the practical use of my novel saw, power is applied to the shaft 10 for the driving of the sprocket wheel 11 and the endless toothed chain, and manifestly when the saw is properly applied and operated, it may be used to advantage for felling large trees and may also be used to advantage for rough carpenter work, the latter especially when the saw is of small size.

Manifestly the utilization of the major portion of the body plate 1 as a guide for the stretches of the endless toothed chain is of the essence of my invention, the said body plate portion 1 cooperating with the said stretches of the chain to preclude lateral deflection or play of the said stretches, and this without the assistance of extraneous means and without in any measure detracting from the ease of movement of the said stretches of the chain.

Notwithstanding the practical advantages ascribed to my endless chain saw, it will be readily appreciated that the saw as a whole is simple, compact in construction, is susceptible of being conveniently handled and moved from place to place, is well adapted to withstand the rough usage to which saws used in forests and other field work are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the structure and arrangement disclosed, my invention being defined by my appended claims within the scope of which structural changes and changes in arrangement may be made without departure from my invention.

Having described my invention, what I claim and desire to secure by Letters-Patent, is:—

A saw chain made up of flexibly connected teeth, each tooth comprising a body, a tooth carrying member provided with teeth on one side and a dove-tailed projection on the other side resting on the body, a pair of plates one on each side of the body and having portions to straddle and engage the dove-tailed projection, means fixing the plates to the body, means fixing the plates to the dove-tailed projection, an ear projecting from one end of the body, ears projecting from the plates at the other end of the body, and means pivoting the first ear of one of the teeth between the second ears of another tooth.

In testimony whereof I affix my signature.

RALPH KIRBY.